US010057815B2

(12) United States Patent
Rico Alvarino et al.

(10) Patent No.: US 10,057,815 B2
(45) Date of Patent: Aug. 21, 2018

(54) PHYSICAL BROADCAST CHANNEL REPETITION FOR EVOLVED MACHINE TYPE COMMUNICATION

(71) Applicant: QUALCOMM Incorporated, San Diego, CA (US)

(72) Inventors: Alberto Rico Alvarino, San Diego, CA (US); Wanshi Chen, San Deigo, CA (US); Hao Xu, San Diego, CA (US); Madhavan Srinivasan Vajapeyam, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 96 days.

(21) Appl. No.: 15/081,633

(22) Filed: Mar. 25, 2016

(65) Prior Publication Data

US 2016/0338010 A1 Nov. 17, 2016

Related U.S. Application Data

(60) Provisional application No. 62/161,751, filed on May 14, 2015.

(51) Int. Cl.
*H04W 28/22* (2009.01)
*H04W 28/26* (2009.01)
(Continued)

(52) U.S. Cl.
CPC ............... *H04W 28/22* (2013.01); *H04J 4/00* (2013.01); *H04L 5/14* (2013.01); *H04L 5/1469* (2013.01);
(Continued)

(58) Field of Classification Search
CPC ..... H04W 28/22; H04W 28/18; H04W 28/26; H04W 72/04; H04J 4/00; H04J 1/00; H04J 3/00
See application file for complete search history.

(56) References Cited

U.S. PATENT DOCUMENTS

| | | | |
|---|---|---|---|
| 2012/0058791 A1* | 3/2012 | Bhattad | H04L 1/0606 455/509 |
| 2014/0301305 A1 | 10/2014 | Xu et al. | |

(Continued)

OTHER PUBLICATIONS

CATT: "Further Discussion on PBCH Coverage Improvement for MTC UEs," 3GPP Draft; R1-140074, 3rd Generation Partnership Project (3GPP), Mobile Competence Centre ; 650, Route Des Lucioles ; F-06921 Sophia-Antipolis Cedex ; France vol. RAN WG1, no. Prague, Czech Republic; Feb. 10, 2014-Feb. 14, 2014 Jan. 31, 2014 (Jan. 31, 2014), XP050751571, Retrieved from the Internet: URL:http://www.3gpp.org/ftp/tsg_ran/WG1_RL1/TSGR1_76/ Docs/ [retrieved on Jan. 31, 2014] the whole document.

(Continued)

*Primary Examiner* — Ashley L Shivers
(74) *Attorney, Agent, or Firm* — Patterson & Sheridan, LLP

(57) ABSTRACT

Certain aspects of the present disclosure generally relate to wireless communications, and more specifically, to physical broadcast channel (PBCH) or other type channel repetition for enhanced machine type communication (eMTC). According to certain aspects, a method is provided for wireless communications by a base station (BS). The method generally includes determining a repetition pattern indicating subframes of a radio frame in which a channel is to be transmitted and transmitting the channel according to the determined repetition pattern.

28 Claims, 12 Drawing Sheets

(51) Int. Cl.
*H04J 4/00* (2006.01)
*H04L 5/14* (2006.01)
*H04W 4/00* (2018.01)
*H04W 72/00* (2009.01)
*H04W 72/04* (2009.01)
*H04W 72/12* (2009.01)

(52) U.S. Cl.
CPC ........... *H04W 4/005* (2013.01); *H04W 28/26* (2013.01); *H04W 72/005* (2013.01); *H04W 72/042* (2013.01); *H04W 72/1205* (2013.01)

(56) References Cited

U.S. PATENT DOCUMENTS

| 2015/0043420 | A1* | 2/2015 | Xiong | H04B 7/15507 370/315 |
|---|---|---|---|---|
| 2015/0078300 | A1 | 3/2015 | Xu et al. | |
| 2015/0085717 | A1* | 3/2015 | Papasakellariou | H04L 5/14 370/280 |
| 2016/0029352 | A1* | 1/2016 | Wong | H04L 1/001 370/315 |
| 2017/0048851 | A1* | 2/2017 | Yang | H04W 52/04 |
| 2017/0311319 | A1* | 10/2017 | Lee | H04L 5/14 |

OTHER PUBLICATIONS

CATT: "PPCH Coverage Improvement for Low-cost MTC UEs," 3GPP Draft; R1-130982, 3rd Generation Partnership Project (3GPP), Mobile Competence Centre ; 650, Route Des Lucioles ; F-06921 Sophia-Antipolis Cedex ; France vol. RAN WG1, no. Chicago, USA; Apr. 15, 2013-Apr. 19, 2013 Apr. 6, 2013 (Apr. 6, 2013), XP050696975, Retrieved from the Internet: URL:http://www.3gpp.org/ftp/tsg_ran/WG1_RL1/TSGR1_72b/Docs/ [retrieved on Apr. 6, 2013].
International Search Report and Written Opinion—PCT/US2016/024492—ISA/EPO—Jun. 13, 2016.

* cited by examiner

Uplink-downlink configurations.

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

*FIG. 5*

Subframe Availability for TDD

| Subframe | Issues |
| --- | --- |
| 0 | Agreed for repetition |
| 1 | Partial DL |
| 2 | U |
| 3 | U (except 5) |
| 4 | U (0-3-6) |
| 5 | SIB1, Always D, Paging |
| 6 | Partial DL (0,1,2,6), Paging in TDD |
| 7 | MBSFN, U in (0-1-2-6) |
| 8 | MBSFN |
| 9 | U (0), MBSFN |

*FIG. 8*

Subframe Availability for FDD

| Subframe | Issues |
|---|---|
| 0 | Agreed for repetition |
| 1 | MBSFN |
| 2 | MBSFN |
| 3 | MBSFN |
| 4 | Paging |
| 5 | SIB1, Paging |
| 6 | MBSFN |
| 7 | MBSFN |
| 8 | MBSFN |
| 9 | Paging |

*FIG. 9*

PHYSICAL BROADCAST CHANNEL REPETITION FOR EVOLVED MACHINE TYPE COMMUNICATION

CLAIM OF PRIORITY UNDER 35 U.S.C. § 119

This application claims benefit of U.S. Provisional Patent Application Ser. No. 62/161,751, filed May 14, 2015, which is herein incorporated by reference in its entirety.

BACKGROUND

I. Field of the Invention

Certain aspects of the present disclosure generally relate to wireless communications, and more specifically, to physical broadcast channel (PBCH) or other type channel repetition for enhanced machine type communication (eMTC).

II. Description of Related Art

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) including LTE-Advanced systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Aspects of the present disclosure provide a method for wireless communications by a base station (BS). The method generally includes determining a repetition pattern indicating subframes of a radio frame in which a channel is to be transmitted and transmitting the channel according to the determined repetition pattern.

Aspects of the present disclosure provide an apparatus for wireless communications by a base station (BS). The apparatus generally includes at least one processor configured to determine a repetition pattern indicating subframes of a radio frame in which a channel is to be transmitted and transmit the channel according to the determined repetition pattern. The apparatus also includes a memory coupled with the at least one processor.

Aspects of the present disclosure provide an apparatus for wireless communications by a base station (BS). The apparatus generally includes means for determining a repetition pattern indicating subframes of a radio frame in which a channel is to be transmitted and means for transmitting the channel according to the determined repetition pattern.

Aspects of the present disclosure provide a non-transitory computer-readable medium for wireless communications by a base station (BS). The non-transitory computer-readable medium generally includes instructions for determining a repetition pattern indicating subframes of a radio frame in which a channel is to be transmitted and transmitting the channel according to the determined repetition pattern.

Aspects of the present disclosure provide a method for wireless communications by a user equipment (UE). The method generally includes determining a repetition pattern indicating subframes of a radio frame in which a channel is to be transmitted and monitoring for transmission of the channel according to the determined repetition pattern.

Aspects of the present disclosure provide an apparatus for wireless communications by a user equipment (UE). The apparatus generally includes at least one processor configured to determine a repetition pattern indicating subframes of a radio frame in which a channel is to be transmitted and monitor for transmission of the channel according to the determined repetition pattern. The apparatus also includes a memory coupled with the at least one processor.

Aspects of the present disclosure provide an apparatus for wireless communications by a user equipment (UE). The apparatus generally includes means for determining a repetition pattern indicating subframes of a radio frame in which a channel is to be transmitted and means for monitoring for transmission of the channel according to the determined repetition pattern.

Aspects of the present disclosure provide a non-transitory computer-readable medium for wireless communications by a user equipment (UE). The non-transitory computer-readable medium generally includes instructions for determining a repetition pattern indicating subframes of a radio frame in which a channel is to be transmitted and monitoring for transmission of the channel according to the determined repetition pattern.

Numerous other aspects are provided including methods, apparatus, systems, computer program products, and processing systems.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 5 illustrates example subframe configurations, according to certain aspects of the present disclosure.

FIG. 8 illustrates example subframe availability for time division duplexing (TDD), according to certain aspects of the present disclosure.

FIG. 9 illustrates example subframe availability for frequency division duplexing (FDD), according to certain aspects of the present disclosure.

DETAILED DESCRIPTION

Aspects of the present disclosure provide techniques and apparatus for enhancing downlink coverage for certain user equipments (e.g., low cost, low data rate UEs). For example, aspects of the present disclosure provide techniques for physical broadcast channel (PBCH) repetition.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "network" and "system" are often used interchangeably. A CDMA network may implement a radio technology such as Universal Terrestrial Radio Access (UTRA), cdma2000, etc. UTRA includes Wideband-CDMA (W-CDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE/LTE-A, and LTE/LTE-A terminology is used in much of the description below.

Example Wireless Communications System

Figure 1:
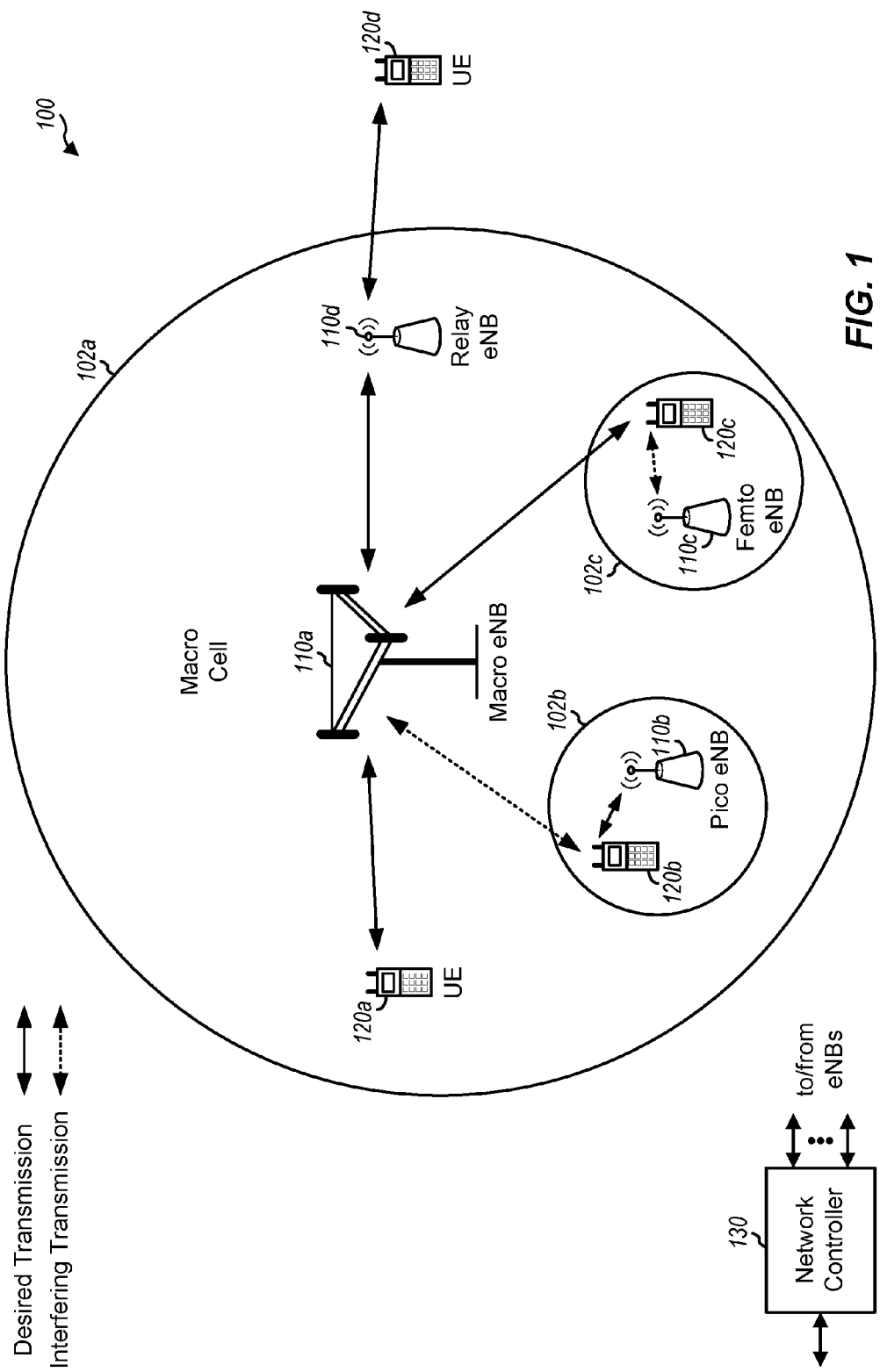
FIG. 1 is a block diagram conceptually illustrating an example wireless communication network, in accordance with certain aspects of the present disclosure.

FIG. 1 shows a wireless communication network 100, which may be an LTE network or some other wireless network in which the techniques and apparatus of the present disclosure may be applied. Wireless network 100 may include a number of evolved Node Bs (eNBs) 110 and other network entities. An eNB is an entity that communicates with user equipments (UEs) and may also be referred to as a base station, a Node B, an access point (AP), etc. Each eNB may provide communication coverage for a particular geographic area. In 3GPP, the term "cell" can refer to a coverage area of an eNB or an eNB subsystem serving this coverage area, depending on the context in which the term is used.

An eNB may provide communication coverage for a macro cell, a pico cell, a femto cell, or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB", "base station," and "cell" may be used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 W) whereas pico eNBs, femto eNBs, and relay eNBs may have lower transmit power levels (e.g., 0.1 to 2 W).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a mobile station (MS), a subscriber unit, a station (STA), etc. A UE may be a cellular phone, a personal digital assistant (PDA), a wireless modem, a wireless communication device, a handheld device, a laptop computer, a cordless phone, a wireless local loop (WLL) station, a tablet, a smart phone, a netbook, a smartbook, an ultrabook, etc.

Figure 2:
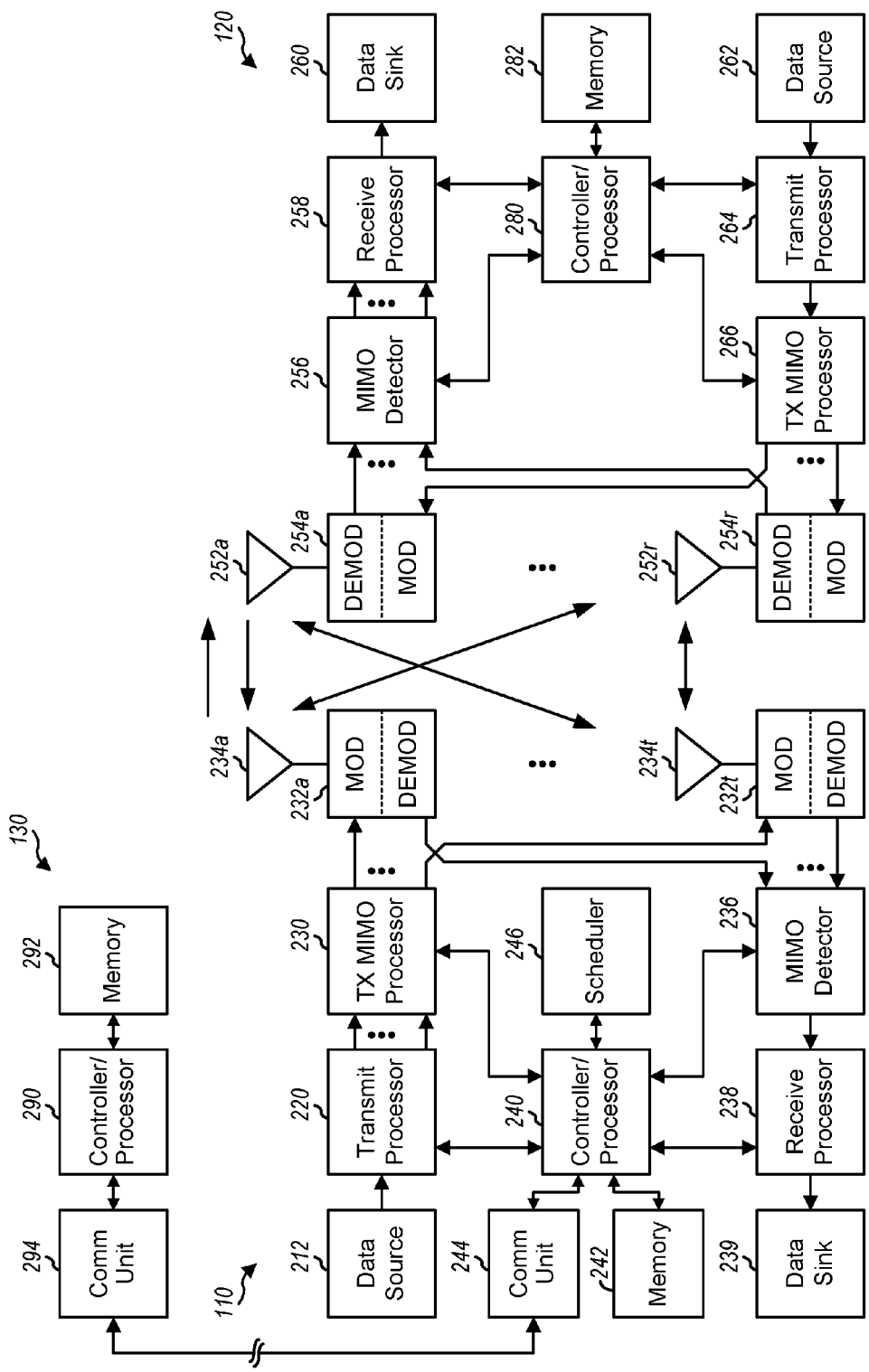
FIG. 2 is a block diagram conceptually illustrating an example of an evolved node B (eNB) in communication with a user equipment (UE) in a wireless communications network, in accordance with certain aspects of the present disclosure.

FIG. 2 is a block diagram of a design of base station/eNB 110 and UE 120, which may be one of the base stations/eNBs and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Processor 220 may also generate reference symbols for reference signals (e.g., the common reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 or other base stations and may provide received signals to demodulators (DEMODs) 254a through 254r, respectively. Each demodulator 254 may condition (e.g., filter, amplify, downconvert, and digitize) its received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), CQI, etc.

On the uplink, at UE 120, a transmit processor 264 may receive and process data from a data source 262 and control information (e.g., for reports comprising RSRP, RSSI, RSRQ, CQI, etc.) from controller/processor 280. Processor 264 may also generate reference symbols for one or more reference signals. The symbols from transmit processor 264 may be precoded by a TX MIMO processor 266 if applicable, further processed by modulators 254a through 254r (e.g., for SC-FDM, OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 may direct the operation at base station 110 and UE 120, respectively. Controller/processor 240 or other controllers/processors and modules at base station 110, or controller/processor 280 or other controllers/processors and modules at UE 120, may perform or direct other processes for the techniques described herein. Memories 242 and 282 may store data and program codes for base station 110 and UE 120, respectively. A scheduler 246 may schedule UEs for data transmission on the downlink or uplink.

When transmitting data to the UE 120, the base station 110 may be configured to determine a bundling size based at least in part on a data allocation size and precode data in bundled contiguous resource blocks of the determined bundling size, wherein resource blocks in each bundle may be precoded with a common precoding matrix. That is, reference signals (RSs) such as UE-RS or data in the resource blocks may be precoded using the same precoder. The power level used for the UE-RS in each resource block (RB) of the bundled RBs may also be the same.

The UE 120 may be configured to perform complementary processing to decode data transmitted from the base station 110. For example, the UE 120 may be configured to determine a bundling size based on a data allocation size of received data transmitted from a base station in bundles of contiguous RBs, wherein at least one reference signal in resource blocks in each bundle are precoded with a common precoding matrix, estimate at least one precoded channel based on the determined bundling size and one or more RSs transmitted from the base station, and decode the received bundles using the estimated precoded channel.

Figure 3:
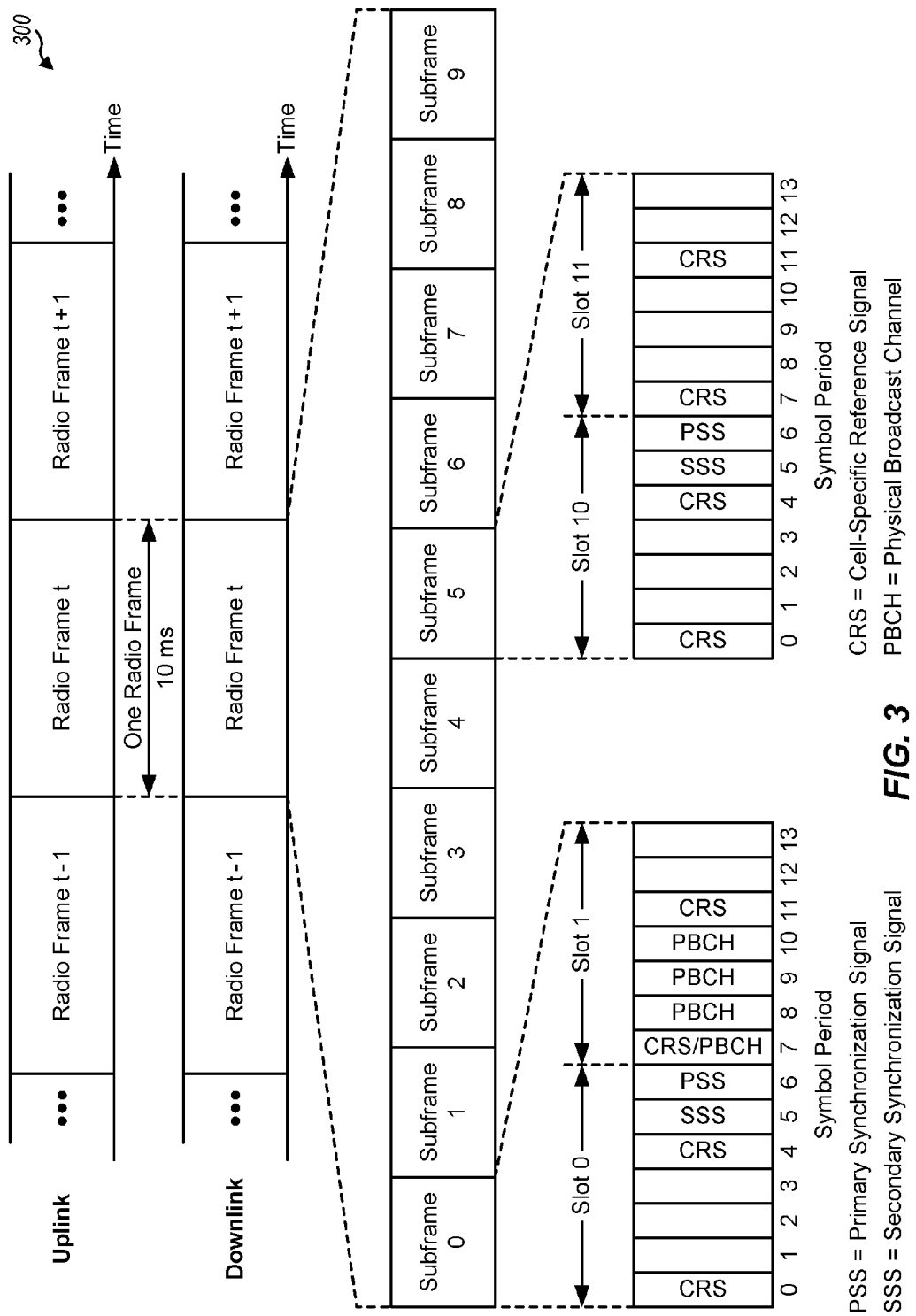
FIG. 3 is a block diagram conceptually illustrating an example frame structure for a particular radio access technology (RAT) for use in a wireless communications network, in accordance with certain aspects of the present disclosure.

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, or other functions. The eNB may also transmit a physical broadcast channel (PBCH) in symbol periods 0 to 3 in slot 1 of certain radio frames. The PBCH may carry some system information. The eNB may transmit other system information such as system information blocks (SIBs) on a physical downlink shared channel (PDSCH) in certain subframes. The eNB may transmit control information/data on a physical downlink control channel (PDCCH) in the first B symbol periods of a subframe, where B may be configurable for each subframe. The eNB may transmit traffic data or other data on the PDSCH in the remaining symbol periods of each subframe.

The PSS, SSS, CRS, and PBCH in LTE are described in 3GPP TS 36.211, entitled "Evolved Universal Terrestrial Radio Access (E-UTRA); Physical Channels and Modulation," which is publicly available.

Figure 4:
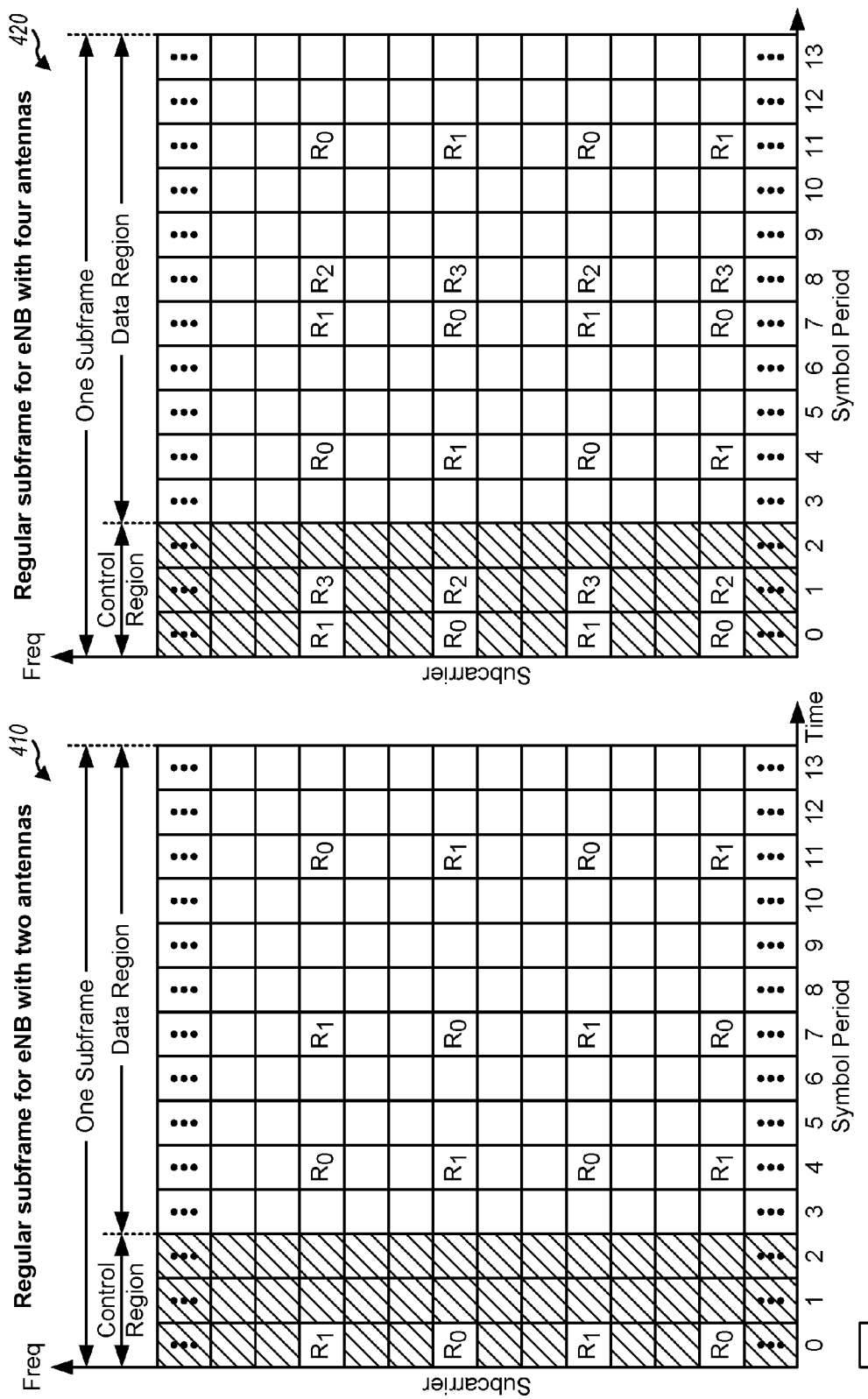
FIG. 4 illustrates example subframe formats for the downlink with a normal cyclic prefix, in accordance with certain aspects of the present disclosure.

FIG. 4 shows two example subframe formats 410 and 420 for the downlink with a normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7, and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7, and 11 and from antennas 2 and 3 in symbol periods 1 and 8. For both subframe formats 410 and 420, a CRS may be transmitted on evenly spaced subcarriers, which may be determined based on cell ID. Different eNBs may transmit their CRSs on the same or different subcarriers, depending on their cell IDs. For both subframe formats 410 and 420, resource elements not used for the CRS may be used to transmit data (e.g., traffic data, control data, or other data).

An interlace structure may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q∈{0, . . . , Q−1}.

The wireless network may support hybrid automatic retransmission request (HARQ) for data transmission on the downlink and uplink. For HARQ, a transmitter (e.g., an eNB 110) may send one or more transmissions of a packet until the packet is decoded correctly by a receiver (e.g., a UE 120) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, path loss, etc. Received signal quality may be quantified by a signal-to-interference-plus-noise ratio (SINR), or a reference signal received quality (RSRQ), or some other metric. The UE may operate in a dominant interference scenario in which the UE may observe high interference from one or more interfering eNBs.

In LTE, different configurations for uplink and downlink subframe directions are supported for both frequency division duplexing (FDD) and time division duplexing (TDD) frame structures FIG. 5 shows seven possible downlink (DL) and uplink (UL) subframe configurations supported for TDD. Each DL/UL subframe configuration may have an associated switch-point periodicity, which may be either five or ten milliseconds. Each subframe may either be an uplink, downlink, or special subframe. As evident from the table in FIG. 5, for a subframe configuration having a five millisecond switching periodicity, there are two special subframes within one frame. For a subframe configuration having a ten millisecond switching periodicity, there is one special subframe within one frame.

In some cases, certain transmissions may be repeated in an effort to increase the likelihood of successful reception. For example, in certain systems (e.g., Long Term Evolution (LTE) Release 8 or more recent), transmission time interval (TTI) bundling (e.g., subframe bundling) can be configured on a per-user equipment (UE) basis. TTI bundling may be configured by the parameter, ttiBundling, provided from higher layers. If TTI bundling is configured for a UE, the subframe bundling operation may only be applied to the uplink shared channel (UL-SCH), for example, physical uplink shared channel (PUSCH), and may not be applied to other uplink signals or traffic (e.g., such as uplink control information (UCI)). In some cases, TTI bundling size is fixed at four subframes (e.g., the PUSCH is transmitted in four consecutive subframes). The same hybrid automatic repeat request (HARQ) process number can be used in each of the bundled subframes. The resource allocation size may be restricted to up to three resource blocks (RBs) and the modulation order can be set to two (e.g., quadrature phase shift keying (QPSK)). A TTI bundle can be treated as a single resource for which a single grant and a single HARQ acknowledgement (ACK) is used for each bundle.

Example PBCH Repetition for eMTC

For certain systems (e.g., LTE Release 12), coverage enhancements (e.g., for physical broadcast channel (PBCH)) may be desirable in a variety of scenarios. For example, coverage enhancements may be desirable for providing service to machine-type communication (MTC) devices or devices in deep coverage holes (e.g., in basements, or valleys). Coverage enhancements may be desirable in deployment of higher frequencies (e.g., high microwave or millimeter wave frequencies) for increased bandwidth communications. Coverage enhancements may further be desired for low data rate users, delay tolerant users, voice over internet protocol (VoIP) and medium data rate users, and so on.

Typically, PBCH is transmitted every 40 ms with one burst every 10 ms in length. According to certain aspects, for PBCH coverage enhancement, an eNodeB (eNB) may perform repetition or bundling of the PBCH.

As noted above, PBCH may be repeated in order to enhance coverage. For example, PBCH repetition may be performed in all radio frames and within at least two subframes of the radio frame. In some cases, it may be up to the network whether to configure PBCH repetitions in a cell or not. PBCH repetition configuration may be regarded as a long-term property of the cell, and thus a UE may assume the PBCH repetition configuration is the same when becoming active after a period of inactivity (e.g., when waking up from a DRX cycle).

According to certain aspects, PBCH repetition may be performed differently for different system types (e.g., time division duplexing (TDD) and frequency division duplexing (FDD)) and may be based on a subframe configuration of a cell and/or based on an operating bandwidth (e.g., 1.4 MHz, 3 MHz, 5 MHz, 10 MHz, 15 MHz and 20 MHz), as described below.

Figure 6:
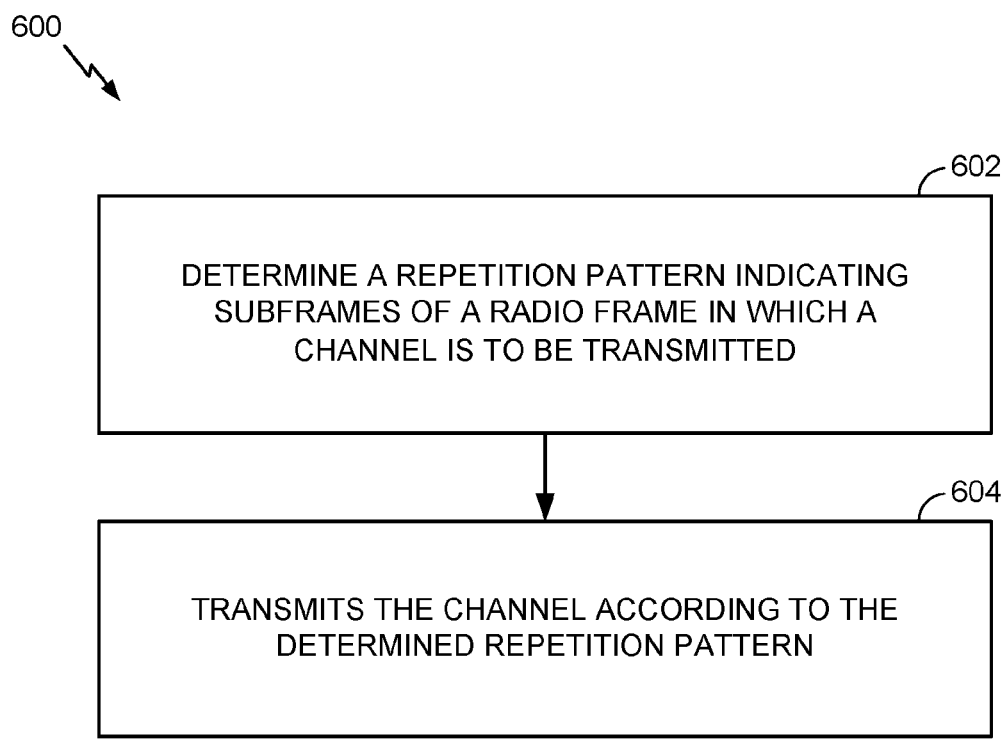
FIG. 6 illustrates example operations for a base station, according to certain aspects of the present disclosure.

FIG. 6 illustrates example operations 600 that may be performed, for example, by a base station (BS) for PBCH (or other type of channel) repetition for eMTC, according to certain aspects of the present disclosure.

Operations 600 begin, at 602, by determining (e.g., based at least on a subframe configuration and/or system bandwidth), a repetition pattern indicating subframes of a radio frame in which a channel is to be transmitted. At 604, the BS transmits the channel according to the determined repetition pattern.

Figure 7:
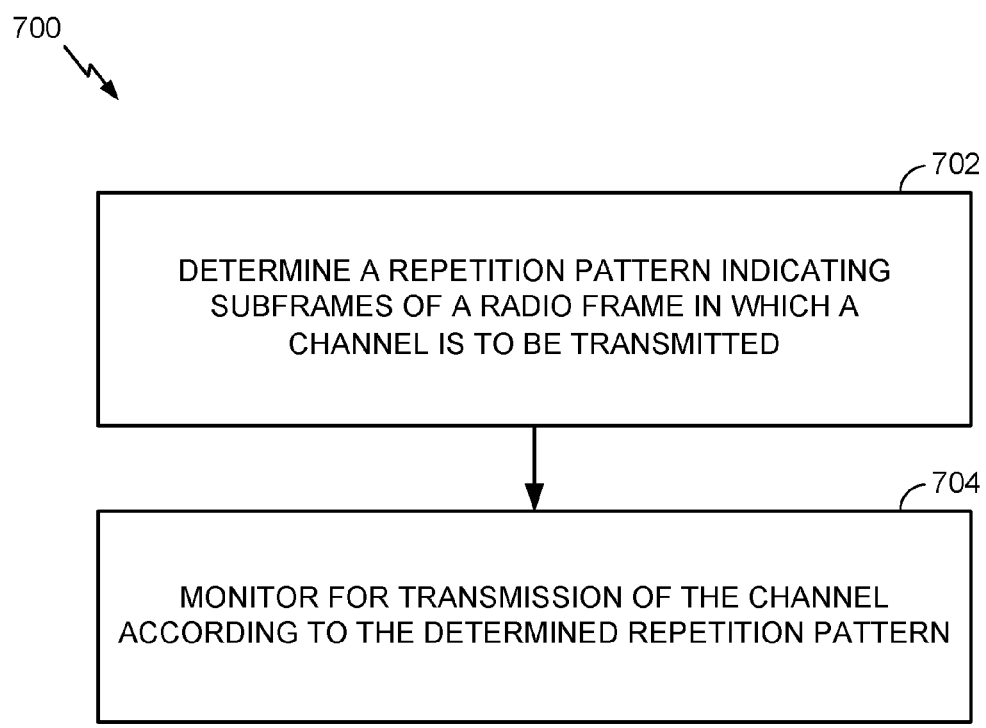
FIG. 7 illustrates example operations for a user equipment, according to certain aspects of the present disclosure.

FIG. 7 illustrates example operations 700 that may be performed, for example, by a user equipment (UE), to monitor for PBCH repetition for eMTC, according to certain aspects of the present disclosure.

Operations 700 begin at 702 by determining (e.g., based at least on a subframe configuration and/or system bandwidth), a repetition pattern indicating subframes of a radio frame in which a channel is to be transmitted. At 704, the UE monitors for transmission of the channel according to the determined repetition pattern.

One type of channel that may be repeatedly transmitted is a broadcast channel, such as PBCH. As noted above, PBCH may be repeated, according to a repetition pattern, in order to enhance coverage. According to certain aspects, based on a subframe configuration and/or operating bandwidth, PBCH may be repeated in the time domain (e.g., bundled) according to a repetition pattern. For example, PBCH may be transmitted in multiple subframes within a radio frame (e.g., according to a repetition pattern which may be based on a subframe configuration and/or operating bandwidth). However, the subframes available/suitable for such transmission may vary based on the type of subframe configuration and/or system bandwidth.

For example, FIG. 8 illustrates TDD subframes that may be available for PBCH repetition. As shown, subframe 0 (the typical position for PBCH transmission as shown in FIG. 3) may be used for PBCH transmission. In some cases, it may be possible to use subframe 4 for PBCH repetition except in subframe configurations 0, 3 and 6. In some cases, subframe 5 may be used for PBCH transmission since it is downlink (DL) for all subframe configurations, as illustrated in FIG. 7. However, due to the whole BW being used for SIB1 in 1.4 MHz, it may not be possible to repeat PBCH transmission for 1.4 MHz. However, it may not be necessary to provide PBCH repetition for 1.4 MHz since 1.4 MHz has a high spectral density, meaning that 1.4 MHz may already have the gain that repetition would provide. In some cases, subframe 9 may be used for PBCH repetition except in subframe configuration 0 since subframe 9 in subframe configuration 0 is uplink (UL).

In view of the above, it may be advantageous to provide PBCH repetition in subframe 5 (i.e., PBCH is transmitted in subframe 0 and repeated in subframe 5) for operating bandwidths 3 MHz, 5 MHz, 10 MHz, 15 MHz and 20 MHz since, as illustrated in FIG. 7, subframe 5 is DL for all subframe configurations. As noted above, subframe repetition for 1.4 MHz may not be necessary since 1.4 MHz has a high spectral density and already has the gain that PBCH repetition would provide.

According to certain aspects, PBCH repetition in subframe 5 may affect SIB scheduling. For example, PBCH repetition in subframe 5 would use the center 6 resource blocks (RBs) of the operating bandwidths for PBCH transmission, which are typically used for SIB transmission. Thus, if PBCH repetition is provided in subframe 5, SIB should be scheduled in such a way so as to not collide with the PBCH repetition (e.g., by scheduling SIB outside the center 6 RBs).

According to certain aspects, it may be advantageous to provide PBCH transmission repetition in subframe 9 for each operating bandwidth except when subframe configuration 0 is being used. For example, PBCH may be transmitted in subframe 0 and repeated in subframe 9. However, this option may leave little room for DL data for 1.4 MHz operating bandwidth for some subframe configurations (e.g., subframe configuration 6) since PBCH is transmitted in subframe 0 and SIB is transmitted in subframe 5.

According to certain aspects, PBCH may be repeated in cells with frequency domain duplexing (FDD) and/or time domain duplexing (TDD) to achieve enhanced coverage. For example, PBCH may be repeated according to a repetition pattern that may be based on a subframe configuration, duplexing mode and/or operating bandwidth FIG. 9 illustrates FDD subframes that may be available for PBCH repetition. According to certain aspects, in order to be consistent with the time-domain duplexing repetition, the PBCH may be repeated in subframe 5. However, for repetition in the FDD case, PBCH may be repeated in any paging frame illustrated in FIG. 9 (e.g., subframes 4, 5, and/or 9).

Signaling of PBCH Repetition

In some cases, it may be desirable to signal the use of channel repetition. For example, a UE in good coverage conditions might detect PBCH without repetitions, but may need to know if PBCH is repeated for rate-matching purposes.

Figure 10:
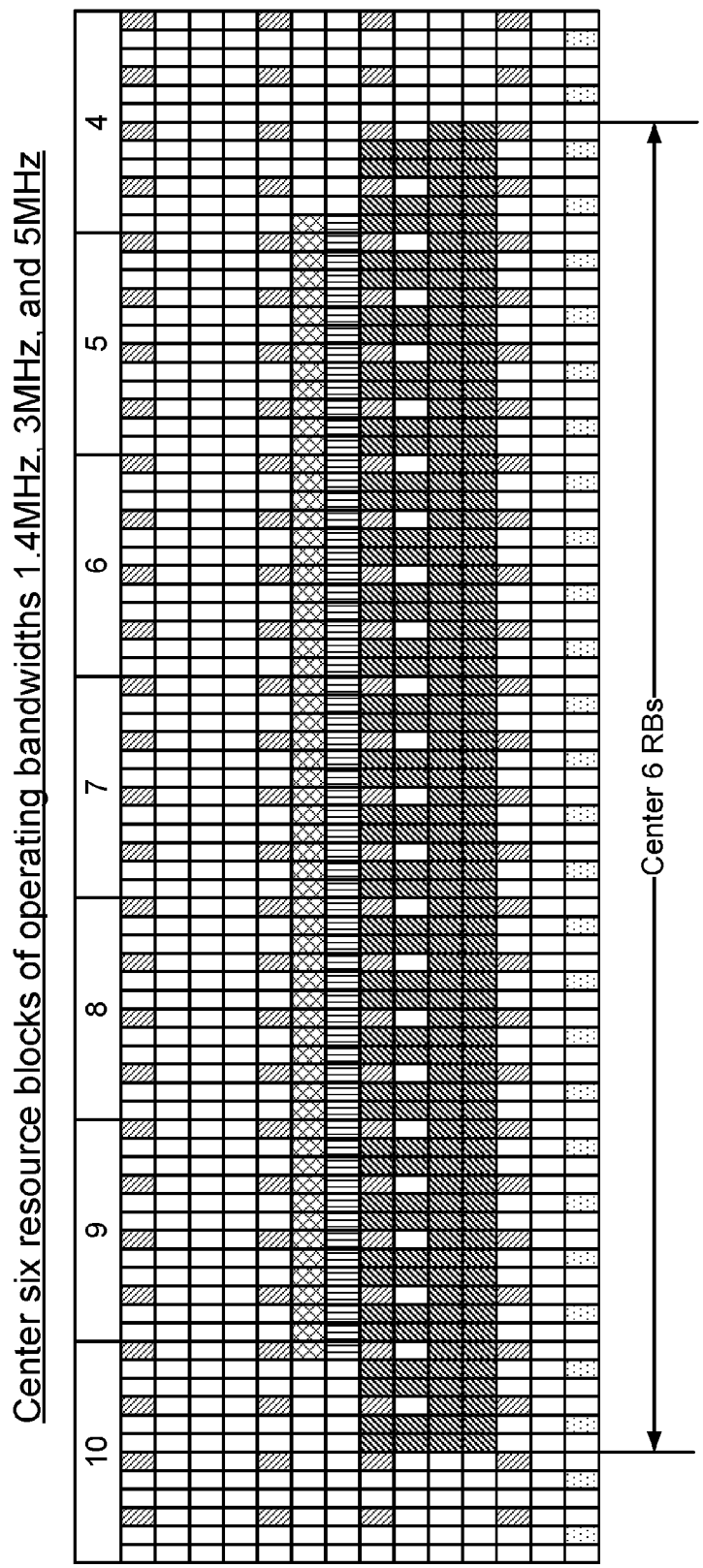
FIG. 10 illustrates the center six resource blocks of a radio frame, according to certain aspects of the present disclosure.

For example, for bandwidths with an odd number of RBs (e.g. 1.4 MHz, 3 MHz, and 5 MHz), the central six RBs may not be aligned with physical resource blocks. For example, as shown in FIG. 10, the center 6 RBs for bandwidth 3 MHz are resource blocks 5-9, half of resource block 4, and half of resource block 10. So, if a UE operating on a cell with an odd number of RBs (e.g. operating bandwidths 1.4 MHz, 3 MHz, or 5 MHz) is not informed that PBCH is scheduled in the center 6 RBs and RB 4, for example, is assigned, the UE does not know if it should rate match around the PBCH repetition or not. Thus, according to certain aspects, a base station may transmit signaling to the UE informing it of whether PBCH repetition is enabled or not.

Figure 11:
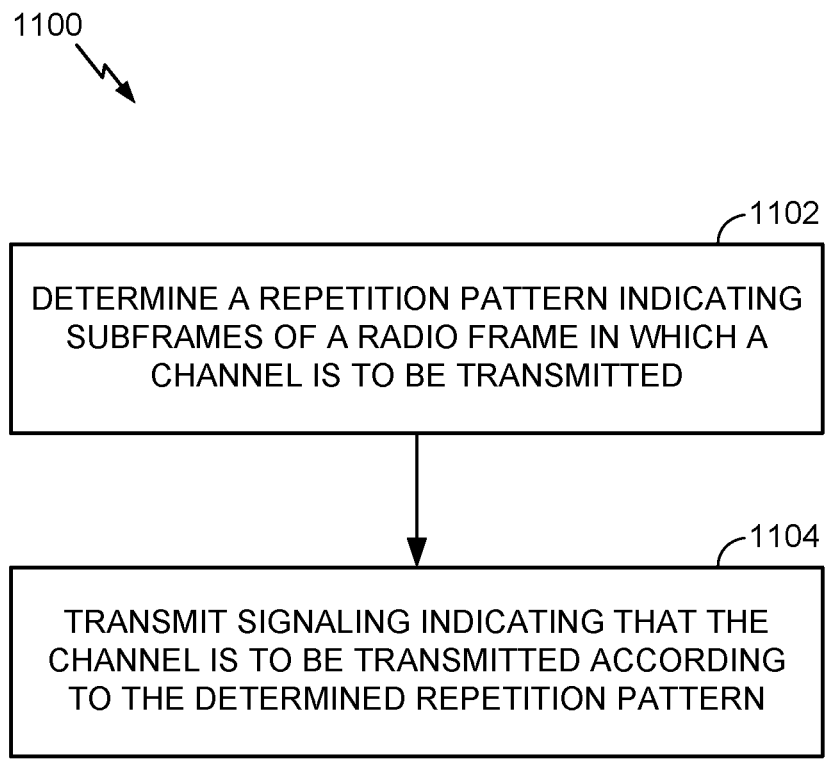
FIG. 11 illustrates example operations for a base station, according to certain aspects of the present disclosure.

FIG. 11 illustrates example operations 1100, performed, for example, by a base station (BS), for transmitting signaling indicating PBCH repetition for eMTC, according to certain aspects of the present disclosure.

Operations 1100 begin at 1102 by determining a repetition pattern indicating subframes of a radio frame in which a channel is to be transmitted. At 1104, the BS transmits signaling indicating that the channel is to be transmitted according to the determined repetition pattern.

Figure 12:
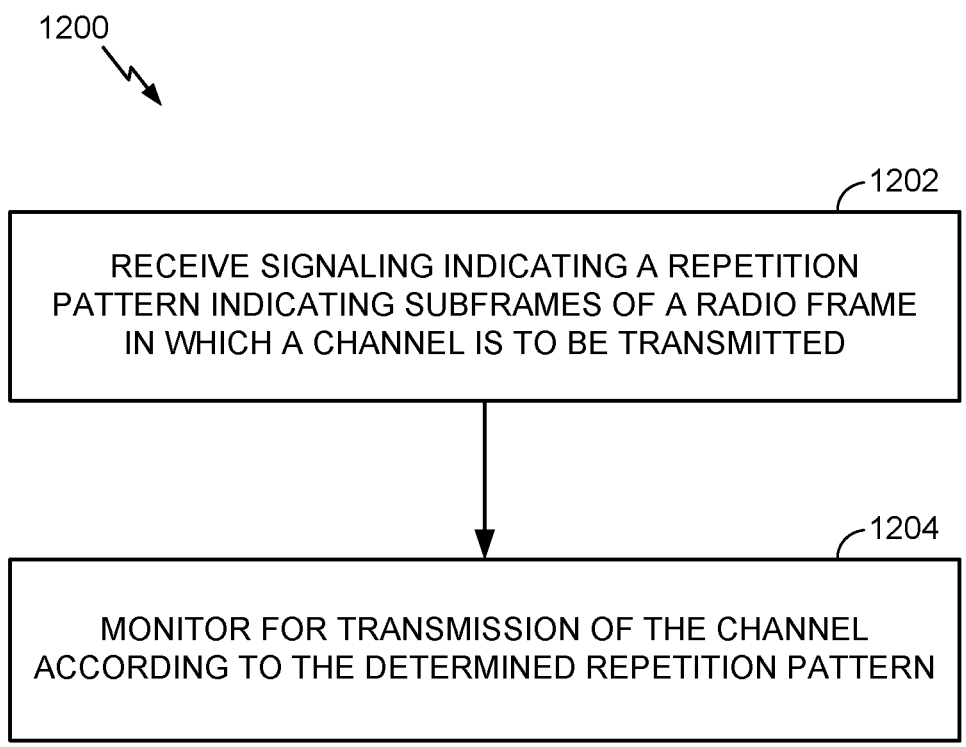
FIG. 12 illustrates example operations for a user equipment, according to certain aspects of the present disclosure.

FIG. 12 illustrates example operations 1200, performed, for example, by a user equipment (UE), for receiving signaling indicating PBCH repetition. As noted above, the signaling may be useful for both eMTC devices and non-eMTC devices.

Operations 1200 begin at 1202 by receiving signaling indicating a repetition pattern indicating subframes of a radio frame in which a channel is to be transmitted. At 1204, the UE monitors for transmission of the channel according to the determined repetition pattern.

As noted above, a base station may transmit signaling to the UE informing it of whether PBCH repetition is enabled or not. In some cases, the signaling informing the UE of whether PBCH repetition is enabled or not may be transmitted by the base station in a master information block (MIB) so that subsequent transmissions (e.g., paging, random access response, SIB1) may be rate-matched around PBCH repetitions.

Additionally, in some cases, the signaling informing the UE of whether PBCH repetition is enabled or not may be transmitted by the base station in SIB1. In such a case, the base station may schedule SIB1 outside of the center 6 RBs; otherwise, SIB1 may be punctured by PBCH.

In some cases, signaling informing the UE of whether PBCH repetition is enabled or not may not be necessary if the base station does not schedule the UE in the central six RBs of the radio frame carrying the PBCH repetition. However, if the UE is scheduled in the center 6 RBs, a channel scheduled in the center 6 RBs may be punctured by the base station in favor of the PBCH.

According to certain aspects, UEs that do not support eMTC capabilities (e.g., Release 13 UEs) but that are able to detect eMTC cell features may benefit from signaling indicating PBCH repetition since their physical downlink shared channel (PDSCH)/enhanced physical downlink control channel (ePDCCH) may be rate matched around a repeated PBCH. In some cases, however, certain UEs may not "understand" PBCH repetition. Thus, for these types of UEs, the BS may puncture their PDSCH/EPDCCH by PBCH.

In some cases, the UE might need to decode a certain channel (e.g. PBCH) without knowing the repetition pattern. In such a case, the UE may blind decode the channel by trying different possible repetition patterns.

While aspects of the present disclosure specifically relate to PBCH repetition, it should be understood that the techniques disclosed herein may apply to any channel repetition. For example, the repetition pattern (e.g. bundle size, hopping) of a downlink (e.g. PDSCH, PDCCH) or uplink (e.g. PUSCH, PUCCH) channel may be selected depending at least on the subframe configuration and/or duplexing mode and/or operating bandwidth.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the corresponding functions. The means may include various hardware or software component(s) or module(s), including, but not limited to a circuit, an application specific integrated circuit (ASIC), or processor. Software shall be construed broadly to mean instructions, instruction sets, code, code segments, program code, programs, subprograms, software modules, applications, software applications, software packages, firmware, routines, subroutines, objects, executables, threads of execution, procedures, functions, etc., whether referred to as software, firmware, middleware, microcode, hardware description language, or otherwise.

For example, depending on the configuration, means for transmitting may comprise a transmitter or antenna(s) 252 of the UE 120, or a transmitter or antenna(s) 234 of eNB 110. Means for receiving may comprise a receiver or antenna(s) 252 of the UE 120, or a receiver or antenna(s) 234 of eNB 110. Means for determining and/or means for monitoring may comprise a processing system, which may include one or more controllers/processors, such as any of the controllers/processors of the UE 120 and the eNB 110 illustrated in FIG. 2.

According to certain aspects, such means may be implemented by processing systems configured to perform the corresponding functions by implementing various algorithms (e.g., in hardware or by executing software instructions). For example, algorithms may include any of the steps illustrated in any one of FIGS. 6, 7, 11, and/or 12.

The various algorithms may implemented by a computer-readable medium, e.g., a non-transitory computer-readable medium. The computer-readable medium may have computer executable instructions (e.g., code) stored thereon. For example, the instructions may be executed by a processor or processing system, such as any of the processors of the UE 120 or eNB 110 illustrated in FIG. 2, and stored in a memory, such as memory 282 of the UE 120 or memory 242 of eNB 110.

The term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form. A phrase referring to "at least one of" a list of items refers to any combination of those items, including single members and duplicate members. As an example, "at least one of: a, b, or c" is intended to cover, for example: a, b, c, a-b, a-c, b-c, a-b-c, aa, a-bb, a-b-cc, and etc.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Generally, where there are operations illustrated in Figures, those operations have corresponding counterpart means-plus-function components with similar numbering.

In one or more exemplary designs, the functions described may be implemented in hardware, software, or combinations thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications by a base station (BS), comprising:
   determining a repetition pattern indicating subframes of a radio frame in which a channel is to be transmitted, wherein the determination is based at least in part on a subframe configuration in use for the radio frame, and wherein the subframe configuration indicates at least one of uplink or downlink subframe directions of the subframes of the radio frame;
   transmitting the channel according to the determined repetition pattern; and
   rate matching one or more other channels around the channel according to the determined repetition pattern.

2. The method of claim 1, wherein a different repetition pattern is determined for a frequency division duplex (FDD) subframe configuration than for a time division duplex (TDD) subframe configuration.

3. The method of claim 2, wherein, for an FDD subframe configuration, the repetition pattern comprises one or more subframes used for paging.

4. The method of claim 2, wherein, for an FDD subframe configuration, the repetition pattern comprises a fifth subframe of the radio frame, and wherein, for a TDD subframe configuration, the repetition pattern comprises a ninth subframe of the radio frame.

5. The method of claim 2, wherein repetition patterns for an FDD subframe configuration and a TDD subframe configuration share at least one common subframe.

6. The method of claim 1, wherein the determination is based, at least in part, on an operating bandwidth, and wherein, for certain subframe configurations, a subframe used for repeating the channel is included in the repetition pattern only for certain operating bandwidths.

7. The method of claim 1, wherein the channel comprises a physical broadcast channel.

8. The method of claim 1, further comprising puncturing one or more other channels when transmitting the channel according to the determined repetition pattern.

9. The method of claim 1, further comprising transmitting signaling indicating that the channel is to be transmitted according to the determined repetition pattern.

10. The method of claim 9, wherein:
    the channel comprises a physical broadcast channel (PBCH); and
    the signaling is provided via a system information block (SIB) transmission.

11. The method of claim 9, further comprising puncturing one or more other channels when transmitting the channel according to the determined repetition pattern.

12. The method of claim 11, wherein at least one of:
    the one or more other channels comprise channels decodable by legacy devices that do not support transmission of the channel according to the determined repetition pattern; or
    the one or more other channels comprise channels decodable by devices that are not aware of the transmission of the channel according to the determined repetition pattern.

13. The method of claim 9, wherein the one or more other channels comprise channels decodable by devices that are aware of the transmission of the channel according to the determined repetition pattern.

14. A method for wireless communications by a user equipment (UE), comprising:
    determining a repetition pattern indicating subframes of a radio frame in which a channel is to be transmitted, wherein the determination is based at least in part on a subframe configuration in use for the radio frame, and wherein the subframe configuration indicates at least one of uplink or downlink subframe directions of the subframes of the radio frame;
    monitoring for transmission of the channel according to the determined repetition pattern; and
    performing rate matching, based on one or more other channels when monitoring for transmission of the channel, according to the determined repetition pattern.

15. The method of claim 14, wherein a different repetition pattern is determined for a frequency division duplex (FDD) subframe configuration than for a time division duplex (TDD) subframe configuration.

16. The method of claim 15, wherein, for an FDD subframe configuration, the repetition pattern comprises one or more subframes used for paging.

17. The method of claim 15, wherein, for an FDD subframe configuration, the repetition pattern comprises a fifth subframe of the radio frame, and wherein, for a TDD subframe configuration, the repetition pattern comprises a ninth subframe of the radio frame.

18. The method of claim 15, wherein repetition patterns for an FDD subframe configuration and a TDD subframe configuration share at least one common subframe.

19. The method of claim 14, wherein the determination is based, at least in part, on an operating bandwidth, and wherein, for certain subframe configurations, a subframe used for repeating the channel is included in the repetition pattern only for certain operating bandwidths.

20. The method of claim 14, wherein the determination is based on detecting of repeated transmission of the channel without prior knowledge of the repetition pattern.

21. The method of claim 14, wherein the one or more other channels comprise channels decodable by legacy devices that do not support transmission of the channel according to the determined repetition pattern.

22. The method of claim 14, wherein the determination is based on received signaling indicating that the channel is to be transmitted according to the determined repetition pattern.

23. The method of claim 22, wherein:
the channel comprises a physical broadcast channel (PBCH); and
the signaling is provided via a system information block (SIB) transmission.

24. The method of claim 22, further comprising performing rate matching based on one or more other channels when monitoring for the channel according to the determined repetition pattern.

25. The method of claim 24, wherein the one or more other channels comprise channels decodable by devices that are not aware of the transmission of the repeated channel according to the determined repetition pattern.

26. The method of claim 22, further comprising rate matching one or more other channels around the channel according to the determined repetition pattern, and wherein the one or more other channels comprise channels decodable by devices that are aware of the transmission of the channel according to the determined repetition pattern.

27. An apparatus for wireless communications by a base station (BS), comprising:
at least one processor configured to:
determine a repetition pattern indicating subframes of a radio frame in which a channel is to be transmitted, wherein the determination is based at least in part on a subframe configuration in use for the radio frame, and wherein the subframe configuration indicates at least one of uplink or downlink subframe directions of the subframes of the radio frame;
transmit the channel according to the determined repetition pattern; and
rate match one or more other channels around the channel according to the determined repetition pattern; and
a memory coupled with the at least one processor.

28. An apparatus for wireless communications by a user equipment (UE), comprising:
at least one processor configured to:
determine a repetition pattern indicating subframes of a radio frame in which a channel is to be transmitted, wherein the determination is based at least in part on a subframe configuration in use for the radio frame, and wherein the subframe configuration indicates at least one of uplink or downlink subframe directions of the subframes of the radio frame;
monitor for transmission of the channel according to the determined repetition pattern; and
perform rate matching, based on one or more other channels when monitoring for transmission of the channel, according to the determined repetition pattern; and
a memory coupled with the at least one processor.

* * * * *